(12) United States Patent
Tiwari et al.

(10) Patent No.: US 9,967,946 B1
(45) Date of Patent: May 8, 2018

(54) OVERSHOOT PROTECTION CIRCUIT FOR LED LIGHTING

(71) Applicant: NXP B.V., Eindhoven (NL)

(72) Inventors: Chandra Prakash Tiwari, Bangalore (IN); Hendrik Boezen, Nijmegen (NL); Henricus Cornelis Johannes Büthker, Eindhoven (NL)

(73) Assignee: NXP B.V., San Jose, CA (US)

( * ) Notice: Subject to any disclaimer, the term of this patent is extended or adjusted under 35 U.S.C. 154(b) by 0 days. days.

(21) Appl. No.: 15/677,000

(22) Filed: Aug. 14, 2017

(51) Int. Cl.
  *H05B 33/08* (2006.01)
  *H05B 37/02* (2006.01)

(52) U.S. Cl.
  CPC ..... *H05B 33/0884* (2013.01); *H05B 33/0827* (2013.01); *H05B 37/02* (2013.01)

(58) Field of Classification Search
  CPC ............ H05B 33/0815; H05B 33/0818; H05B 37/029; H05B 37/02; H05B 33/0884; H05B 33/0827
  USPC .......... 315/210, 291, 193, 308, 307; 362/59; 323/282
  See application file for complete search history.

(56) References Cited

U.S. PATENT DOCUMENTS

| | | | | |
|---|---|---|---|---|
| 7,605,547 | B2 * | 10/2009 | Ng ..................... | H05B 33/0818 315/185 R |
| 8,159,454 | B2 | 4/2012 | Radermacher et al. | |
| 8,847,516 | B2 | 9/2014 | Chobot | |
| 9,800,136 | B2 * | 10/2017 | Eum ...................... | H02M 1/32 |
| 2002/0171467 | A1 * | 11/2002 | Worley, Sr. ........ | H05B 33/0815 327/514 |
| 2007/0120506 | A1 * | 5/2007 | Grant .................. | H05B 33/0827 315/312 |
| 2007/0262724 | A1 | 11/2007 | Mednik et al. | |
| 2009/0040796 | A1 * | 2/2009 | Lalithambika .... | H02M 3/33507 363/21.17 |
| 2009/0085490 | A1 | 4/2009 | Await et al. | |
| 2010/0110682 | A1 * | 5/2010 | Jung .................. | H05B 33/0869 362/249.02 |
| 2011/0121805 | A1 * | 5/2011 | Mirea ..................... | H02M 1/08 323/282 |
| 2012/0026761 | A1 * | 2/2012 | Young ................... | H02M 7/125 363/44 |
| 2012/0158188 | A1 * | 6/2012 | Madala, Sr. .......... | G01F 23/243 700/276 |
| 2012/0161857 | A1 * | 6/2012 | Sakaguchi .............. | H02M 3/07 327/536 |

(Continued)

OTHER PUBLICATIONS

Texas Instruments, "High-Brightness LED Matrix Manager for Automotive Headlight Systems", SLUSBU2A, Sep. 2014, Revised Feb. 2016.

(Continued)

*Primary Examiner* — Douglas W Owens
*Assistant Examiner* — Syed M Kaiser
(74) *Attorney, Agent, or Firm* — Charles E. Bergere; Charlene Jacobsen

(57) ABSTRACT

For an LED lighting application, overshoot-protection circuitry prevents an LED controller, such as a matrix lighting controller (MLC) that controls an array of LEDs, from falsely detecting an open-circuit condition in an LED controlled by the LED controller, by limiting the magnitude of an overshoot voltage (due to long-wire parasitic inductances) from occurring when a switch in the LED controller that is used to control the LED is turned off.

10 Claims, 4 Drawing Sheets

(56) References Cited

U.S. PATENT DOCUMENTS

| | | | | |
|---|---|---|---|---|
| 2012/0313598 A1* | 12/2012 | Arp | ............... | H05B 33/0815 |
| | | | | 323/282 |
| 2013/0038243 A1* | 2/2013 | Lee | ............... | H05B 33/0827 |
| | | | | 315/297 |
| 2013/0293135 A1* | 11/2013 | Hu | ............... | H05B 33/0815 |
| | | | | 315/224 |
| 2014/0028213 A1* | 1/2014 | Sood | ............ | H02M 3/33523 |
| | | | | 315/210 |
| 2014/0151457 A1* | 6/2014 | Wilkerson | ......... | H01L 41/042 |
| | | | | 239/4 |
| 2014/0166959 A1* | 6/2014 | Bertin | ............ | G11C 13/0002 |
| | | | | 257/2 |
| 2015/0002035 A1 | 1/2015 | Schie et al. | | |
| 2015/0123544 A1* | 5/2015 | Yamauchi | ........ | H03K 17/0822 |
| | | | | 315/119 |
| 2015/0137705 A1* | 5/2015 | Li | ........... | G09G 5/10 |
| | | | | 315/307 |
| 2015/0264760 A1* | 9/2015 | Gyoten | ............ | H05B 33/0815 |
| | | | | 353/85 |
| 2017/0099011 A1* | 4/2017 | Freeman | ............ | H02M 7/06 |

OTHER PUBLICATIONS

Texas Instruments, "Ringing Reduction Techniques for NexFETTM High Performance MOSFETs", SLPA010, Nov. 2011.
Fairchild Semiconductor Corporation, "AN-4162—Switch Node Ring Control in Synchronous Buck Regulators", Rev. 1.2., Jun. 2, 2015.
Linear Technology, "8-Switch Matrix LED Dimmer Simplifies Complex LED Matrix Designs", Dec. 9, 2015.

\* cited by examiner

610

OVERSHOOT PROTECTION CIRCUIT FOR LED LIGHTING

BACKGROUND

The present invention relates to LED lighting and, more Particularly, to a circuit for controlling the operations of LED lighting.

FIG. 1 is a schematic block diagram a conventional LED lighting system 100 comprising a set of 12 light-emitting diodes (LEDs) 102(1)-102(12) controlled by a matrix lighting controller (MLC) chip 110, where the LEDs 102 are connected to the MLC chip 110 via wires 104. The 12 LEDs 102 are connected in series between a constant-current source 106 and ground VSS. The voltage at the constant-current source 106 is 60V. In addition, each LED 102 is connected by a pair of wires 104 to a different transistor-based switch 112, where each switch 112 is in turn controlled by a different pulse-width modulation (PWM) driver 114.

FIG. 2 is a schematic circuit diagram showing a portion of the LED lighting system 100 of FIG. 1. In particular, FIG. 2 shows the constant-current source 106, the LEDs 102(10)-102(12), and their corresponding switches 112(10)-112(12) and wires 104, each of which contributes some amount of parasitic inductance. As shown in FIG. 2, the switch 112(11) comprises an n-type main transistor MN1, an n-type turn-off transistor MN2, and a turn-on switch S1, which is connected to a current source 113. Although not shown in FIG. 2, each of switches 112(10) and 112(12) has an analogous set of elements.

The switch 112(11) is opened by (i) opening the turn-on switch S1 and (ii) turning on the turn-off transistor MN2, which drains the gate of the main transistor MN1 to turn off the main transistor MN1. The switch 112(11) is closed by (i) turning off the turn-off transistor MN2 and (ii) closing the turn-on switch S1, which charges the gate of the main transistor MN1 to turn on the main transistor MN1. When the switch 112(11) is turned off, current from the constant-current source 106 passes through the LED 102(11), causing the LED 102(11) to emit light. When the switch 112(11) is turned on, the LED 102(11) is shorted, and the current instead passes through the switch 112(11), thereby bypassing the LED 102(11), which as a result will not emit light.

In general, the MLC chip 110 selectively turns on and off the switches 112(1)-112(12) to control the light emitted from the respective LEDs 102(1)-102(12). Note that, if switch 112(11) is off and switch 112(12) is on, then current will flow from left to right through the upper wire 104u. If switch 112(11) is off and switch 112(10) is on, then current will flow from right to left through the lower wire 104l. On the other hand, if switch 112(11) is on and switch 112(12) is off, then current will flow from right to left through the upper wire 104u. If switch 112(11) is on and switch 112(10) is off, then current will flow from left to right through the lower wire 104l.

As shown in FIG. 1, the MLC chip 110 also has short-circuit (SC) detection circuitry 116 and open-circuit (OC) detection circuitry 118 designed to detect SC and OC conditions, respectively, in the individual LEDs 102 in order to detect faulty LEDs 102 and also to protect the corresponding switches 112. For example, if the LED 102(11) fails with an OC condition, then, when the corresponding switch 112(11) is turned off, the voltage across the LED 102(11)—and therefore the drain-to-source voltage Vds across the main transistor MN1—can get high enough to permanently damage the transistor MN1. To prevent that damage, the OC detection circuitry 118 is designed to quickly detect a high drain-to-source voltage Vds indicative of an OC condition and take appropriate measures, like quickly turning on the switch 112(11), in order to inhibit the drain-to-source voltage Vds from getting large enough to permanently damage the transistor MN1. During normal operations, the MLC chip 110 controls the relative timing of turning on and off the different switches 112(1)-112(12) to avoid over-voltage conditions from occurring.

Unfortunately, if the wires 104 that connect the MLC chip 110 to the LEDs 102 are sufficiently long, then the wires 104 will contribute enough parasitic inductance to result in false-positive detections of LED OC conditions by the OC detection circuitry 118. For example, if switch 112(11) is on and switches 112(10) and 112(12) are off, then current will flow down through the LED 102(12), from right to left through the upper wire 104u, down through switch 112(11), from left to right through the lower wire 104l, and down through the LED(10). If switch 112(11) is then turned off, the parasitic inductances in the upper and lower wires 104u and 104l will resist an instantaneous decrease in the current flowing through those wires, resulting in an induced drain-to-source voltage Vds across the transistor MN1. The longer the wires 104, the greater the parasitic inductance in the wires 104 and the greater the induced drain-to-source voltage Vds. In such cases, the OC detection circuitry 118 may misinterpret a high Vds as an OC condition in the corresponding LED(11). Note that, even if switch 112(10) and/or switch 112(12) is on, then other wires 104 will contribute parasitic inductances that can lead to false-positive detections of an OC condition in the LED(11).

FIG. 3 is a timing diagram showing certain signals associated with the operation of the LED lighting system 100 of FIGS. 1 and 2 when a false-positive detection of an OC condition occurs. At time t0, switch S1 is open and the turn-off transistor MN2 is on (i.e., the gate voltage G2 is high), which drives the gate voltage swg of the main transistor MN1 low and turns MN1 off. With MN1 off, the drain voltage swd of MN1 is high and the LED 102(11) is on. Thus, from time t0 to time t1, current is flowing through the LED 102(11) and no current is flowing through the switch 112(11).

At time t1, the gate voltage G2 is driven low to turn off the transistor MN2 and switch S1 is closed to drive the gate voltage swg high and turn on the transistor MN1, which drives the drain voltage swd of MN1 low and turns off the LED 102(11). Thus, from time t1 to time t2, no current is flowing through the LED 102(11) and instead current is flowing through switch 112(11) and, if switches 112(10) and 112(11) are both off, also through the corresponding wires 104u and 104l connecting the switch 112(11) to the LED 102(11).

At time t2, switch S1 is opened again and the gate voltage G2 of MN2 is again driven high to turn on MN2, which drives the gate voltage swg of MN1 low and turns off MN1. In this particular situation, the presence of parasitic inductances in the wires 104u and 104l cause the drain voltage swd of MN1 to rise and then oscillate in a damped manner. If the initial rise of the drain voltage swd is large enough, then the OC detection circuitry 118 will misinterpret the corresponding large drain-to-source voltage Vds as indicating an OC condition for LED 102(11).

It would be advantageous to provide circuitry that prevents such false-positive detection of OC conditions.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the invention are disclosed herein. However, specific structural and functional details disclosed herein are merely representative for purposes of describing example embodiments of the invention. The invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an, " and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the present invention is an article of manufacture comprising an overshoot-protection circuit for an LED (light-emitting diode) controller. The overshoot-protection circuit comprises (i) a switch-drain node configured to be connected to a drain of a switch in the LED controller that controls at least one LED, (ii) a switch-gate node configured to be connected to a gate of the switch in the LED controller that controls the LED, and (iii) inter-node circuitry connected between the switch-drain and switch-gate node and configured to limit magnitude of drain-to-source voltage of the switch.

Figure 2:
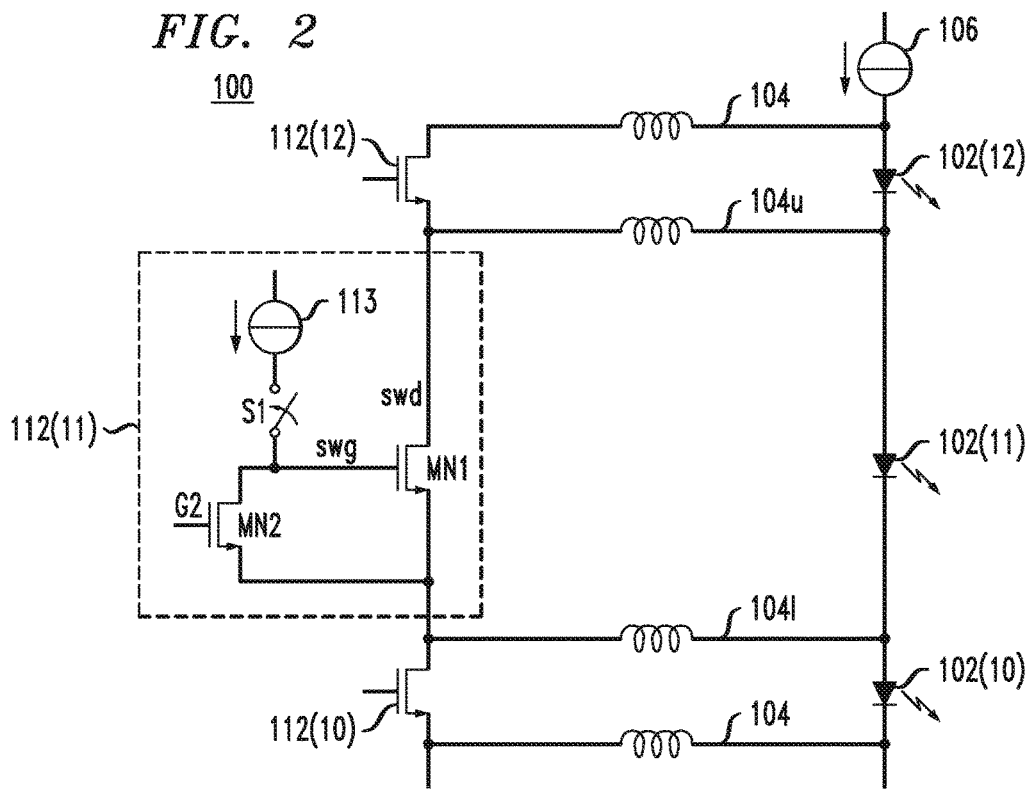
FIG. 2 is a schematic circuit diagram showing a portion of the LED lighting system of FIG. 1.
Figure 4:
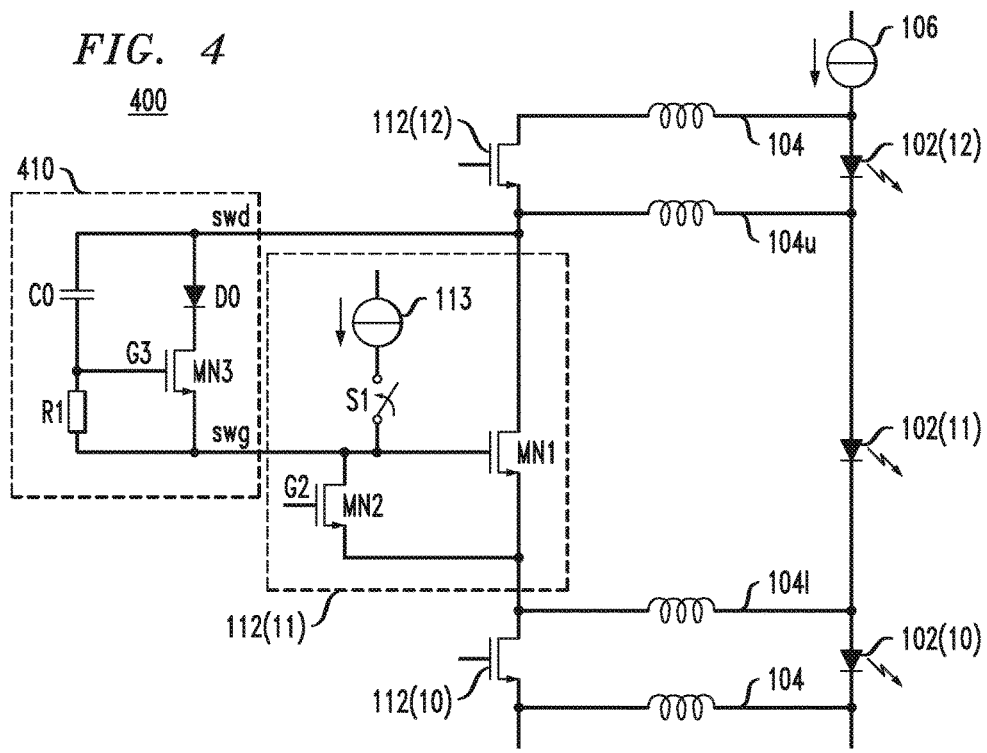
FIG. 4 is a schematic diagram of a portion of an LED lighting system according to one embodiment of the present invention.

FIG. 4 is a schematic diagram of a portion of an LED lighting system 400 according to one embodiment of the present invention that corresponds to the same portion of the conventional LED lighting system 100 shown in FIG. 2. The circuitry shown in FIG. 4 is the same as the circuitry shown in FIG. 2, except that, in FIG. 4, the MLC chip also includes an overshoot-protection circuit 410, which is designed to prevent false-positive detection of an open-circuit (OC) condition in the LED 102(11).

The overshoot-protection circuit 410 has (i) a switch-drain node swd that is connected to the drain of the main transistor MN1 of the switch 112(11) and (ii) a switch-gate node swg that is connected to the gate of MN1. Connected between nodes swd and swg are the series combination of diode D0 and transistor MN3 in parallel with the series combination of diode C0 and resistor R1, where the gate of MN3 is connected between C0 and R1.

Figure 1:
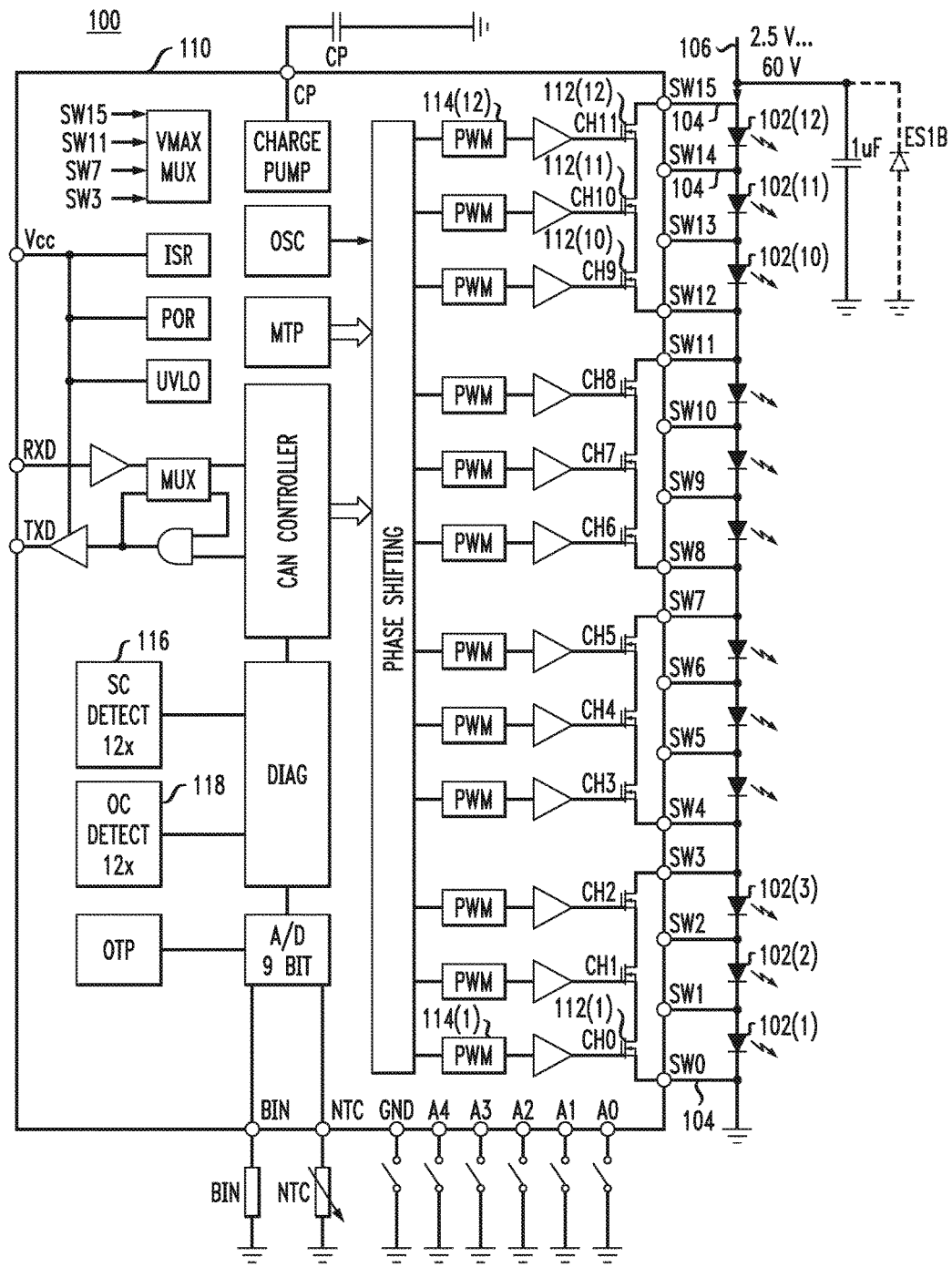
FIG. 1 is a schematic block diagram of a conventional LED lighting system.

As in the conventional LED lighting system 100 of FIGS. 1 and 2, the switch 112(11) is closed by turning off the turn-off transistor MN2 and closing the turn-on switch S1 in order to turn on the main transistor MN1. When MN1 is fully on, the gate voltage swg is higher than the drain voltage swd. If the diode D0 were not present, then the integral body diode of transistor MN3 would conduct and prevent the gate of MN1 from fully charging. The diode D0 blocks this reverse current path, thereby enabling the gate of MN1 to fully charge.

The switch 112(11) is opened by opening the turn-on switch S1 and turning on the turn-off transistor MN2 in order to turn off the main transistor MN1. When the switch 112(11) is closed, current flows through MN1 and the LED 102(11) is off. When the switch 112(11) is open, MN1 is off and current flows through the LED 102(11), which is on.

Figure 3:
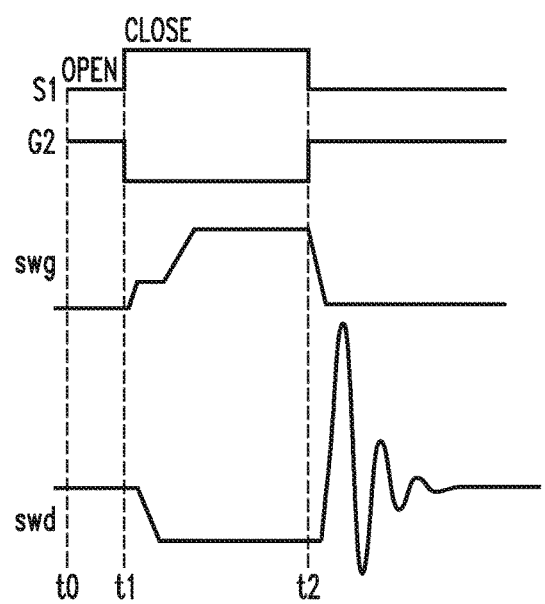
FIG. 3 is a timing diagram showing certain signals associated with the operation of the LED lighting system of FIGS. 1 and 2 when a false-positive detection of an OC condition occurs.
Figure 5:
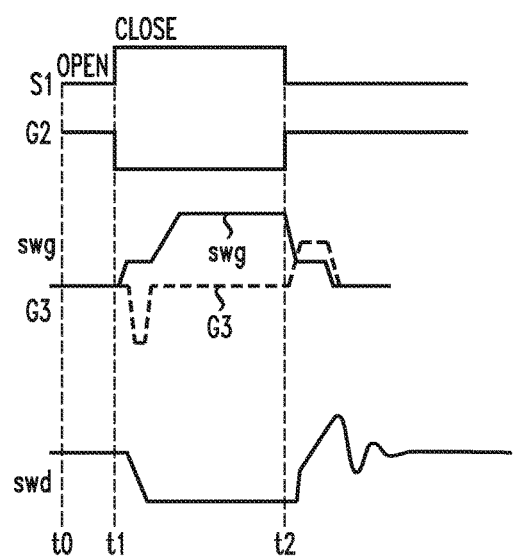
FIG. 5 is a timing diagram showing certain signals associated with the operation of the LED lighting system of FIG. 4 for the same scenario as in FIG. 3.

FIG. 5 is a timing diagram showing certain signals associated with the operation of the LED lighting system 400 of FIG. 4 for the same scenario as in FIG. 3. The operation of the LED lighting system 400 from time t0 up until time t2 are similar to the operation of the LED lighting system 100 of FIGS. 1 and 2, with the switch 112(11) being open and the LED 102(11) being on from time t0 to time t1, and the switch 112(11) being closed and the LED 102(11) being off from time t1 to time t2. At time t2, the switch 112(11) is again opened in order to turn on the LED 102(11).

To transition from the LED 102(11) being off to the 102(11) being on, at time t2, the MLC chip 110 starts the process of turning off the main transistor MN1 by opening the turn-on switch S1 and turning on the turn-off transistor MN2 (by driving MN2's gate voltage G2 high) in order to drive the gate voltage swg of the main transistor MN1 low. When the parasitic inductances in the wires 104u and 104l resist the instantaneous change in the current flowing through those wires due to MN1 beginning to turn off, the drain voltage Vd at the drain node swd will rise, which will cause current to flow through capacitor C0 and resistor R1, which will result in a voltage across R1, which will apply a positive gate voltage G3 to turn on the transistor MN3 just enough to allow some current to flow through diode D0 and transistor MN3, which current will fight against the drain current of the turn-off transistor MN2, which will slow down the turning off of the main transistor MN1, thereby allowing some current to continue to flow through MN1, which will prevent a large drain voltage swd and a corresponding large drain-to-source voltage Vds from developing. As a result, the OC detection circuit 118 in the MLC chip 110 will not misinterpret the normal turning off of transistor MN1 as an OC condition of the LED 102(11).

As current continues to flow through C0 and R1, C0 will charge and that current flow will decrease, thereby reducing the voltage across R1 and turning off MN3, which reduces the current flowing through D0 and MN3, which allows MN2 to turn off MN1, thereby completing the opening of switch 112(11) and the turning on of LED 102(11).

The sizes of the various components of the switch 112(11) and the overshoot-protection circuit 410 are selected to limit the rate of change of the drain voltage swd and thereby limit the rate of change of the drain-to-source voltage Vds in order to ensure that the magnitude of MN1's drain-to-source voltage Vds stays below the threshold for OC detection by the OC detection circuit 118, while still ensuring that the switch 112(11) is opened sufficiently quickly.

As described above, when the switch 112(11) is open, the capacitor CO gets charged with a positive voltage. When the switch 112(11) is closed, the switch-gate node swg is high and the switch-drain node swd is low, such that the capacitor CO will get charged with a negative voltage, thereby enabling current to flow through resistor R1 when the switch 112(11) is again opened.

Figure 6:
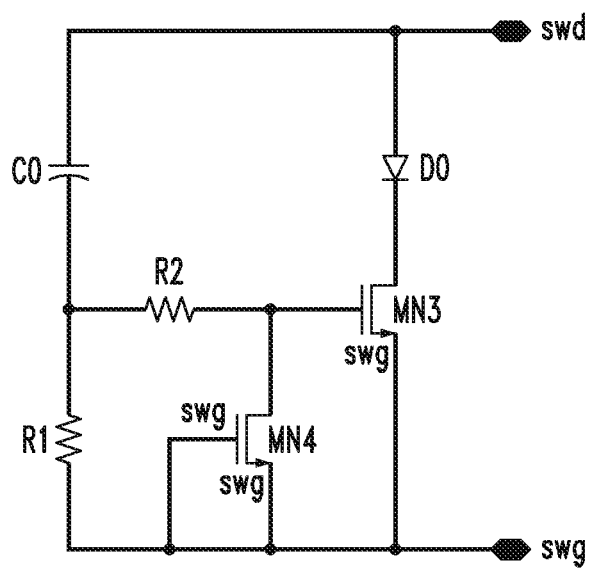
FIG. 6 is a schematic circuit diagram of overshoot-protection circuitry according to an alternative embodiment of the invention.

FIG. 6 is a schematic circuit diagram of overshoot-protection circuit 610, according to an alternative embodiment of the present invention. The overshoot-protection circuit 610 is the same as the overshoot-protection circuit 410 of FIG, 4, with the addition of n-type transistor MN4 and resistor R2, which are included to provide ESD (electrostatic discharge) protection.

In particular, transistor MN4 acts as a Zener diode, and resistor R2 limits the current through MN4 in case of an ESD pulse. Without R2, an ESD pulse between the switch-drain node swd and the switch-gate node swg would charge the gate of transistor MN3 to a high voltage, potentially causing permanent breakdown of its gate oxide.

Although the present invention has been described in the context of the overshoot-protection circuits 410 and 610 of FIGS. 4 and 6, those skilled in the art will understand that other circuit designs can achieve similar results. In general, overshoot-protection circuitry of the present invention limits the rate of change of the drain-to-source voltage of the switch that controls an LED in order to prevent false-positive detection of OC conditions of the LED.

Although the overshoot-protection circuits have been described as being implemented as part of an MLC chip, such as a modified version of the MLC chip 110 of FIG. 1, those skilled in the art will understand that overshoot-protection circuits can alternatively be implemented external to the MLC chip. In that case, overshoot-protection circuit of the present invention can be configured for use with a conventional MLC chip, such as the MLC chip 110 of FIG. 1.

Although the invention has been described in the context of circuitry implemented using n-type transistors, those skilled in the art will understand that the invention can alternatively be implemented using p-type switches either for the switches 112 of FIG. 4 or for the overshoot-protection circuitries 410 and 610 of FIGS. 4 and 6 or both.

Although the invention has been described in the context of a particular set of 12 LEDs 102, those skilled in the art will understand that the invention can alternatively be implemented in the context of other numbers of LEDs.

Although the invention has been described in the context of LED lighting systems in which there is a one-to-one ratio between the switches (e.g., switches 112) and LEDs (e.g., LEDs 102), the invention is not so limited. For example, the invention can be implemented in the context of LED lighting systems in which at least one switch controls multiple LEDs that are connected in series or in parallel.

In certain embodiments, the invention is an article of manufacture comprising overshoot-protection circuitry for an LED (light-emitting diode) controller. The overshoot-protection circuitry comprises (i) a switch-drain node configured to be connected to a drain of a switch in the LED controller that controls at least one LED, (ii) a switch-gate node configured to be connected to a gate of the switch in the LED controller that controls the LED, and (iii) inter-node circuitry connected between the switch-drain and switch-gate node and configured to limit magnitude of drain-to-source voltage of the switch.

In some embodiments, the inter-node circuitry is configured to limit rate of change of the drain-to-source voltage of the switch.

In some embodiments, the overshoot-protection circuitry comprises (i) a diode and a first transistor connected in series between the switch-drain node and the switch-gate node and (ii) a capacitor and a first resistor connected in series between the switch-drain node and the switch-gate node, where the series connection of the capacitor and the first resistor is connected in parallel with the series connection of the diode and the first transistor; the capacitor is connected to the first resistor at a first internal node; and the first internal node is connected to a gate of the first transistor.

In some embodiments, the overshoot-protection circuitry further comprises (i) a second resistor connected between the first internal node and the gate of the first transistor and (ii) a second transistor connected between the gate of the first transistor and the switch-gate node, wherein a gate of the second transistor is connected to the switch-gate node.

In some embodiments, the overshoot-protection circuitry is not integrated with the LED controller on a single chip. In some embodiments of the foregoing, the article further comprises the LED controller. In some embodiments of the foregoing, the overshoot-protection circuitry is integrated with the LED controller on a single chip.

In some embodiments, the article further comprises the LED. In some embodiments of the foregoing, the LED controller is a matrix lighting controller configured to control a plurality of LEDs. In some embodiments of the foregoing, the article further comprises the plurality of LEDs.

In some embodiments, the LED controller comprises open-circuit (OC) detection circuitry configured to monitor the magnitude of the drain-to-source voltage of the switch in order to detect an OC condition in the LED. By limiting the magnitude of the drain-to-source voltage of the switch, the overshoot-protection circuitry prevents false-positive detection of an OC condition in the LED by the OC detection circuitry.

Unless explicitly stated otherwise, each numerical value and range should be interpreted as being approximate as if the word "about" or "approximately" preceded the value or range.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, or paths may be referred to by the same name and are interchangeable for purposes here.

Transistor devices are typically shown as individual transistors for illustrative purposes. However, it is understood by those with skill in the art that transistor devices will have various sizes (e.g., gate width and length) and characteristics (e.g., threshold voltage, gain, etc.) and may consist of multiple transistors coupled in parallel to get desired electrical characteristics from the combination. Further, the illustrated transistor devices may be composite transistors.

As used in this specification and claims, the term "channel terminal" refers generically to either the source or drain of a MOSFET transistor device. Similarly, as used in the claims, the terms "source," "drain," and "gate" should be understood to refer respectively either to the source, drain, and gate of a MOSFET or to the emitter, collector, and base of a bi-polar device if an embodiment of the invention is implemented using bi-polar transistor technology.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. An article of manufacture comprising overshoot-protection circuitry for an LED (light-emitting diode) controller, the overshoot-protection circuitry comprising:
   a switch-drain node configured to be connected to a drain of a switch in the LED controller that controls at least one LED;
   a switch-gate node configured to be connected to a gate of the switch in the LED controller that controls the at least one LED; and
   inter-node circuitry connected between the switch-drain and switch-gate nodes and configured to limit a magnitude of a drain-to-source voltage of the switch.

2. The article of claim 1, wherein the inter-node circuitry is configured to limit a rate of change of the drain-to-source voltage of the switch, thereby limiting the magnitude of the drain-to-source voltage of the switch.

3. The article of claim 1, wherein the overshoot-protection circuitry comprises:
   a diode and a first transistor connected in series between the switch-drain node and the switch-gate node; and
   a capacitor and a first resistor connected in series between the switch-drain node and the switch-gate node,
   wherein:
      the series connection of the capacitor and the first resistor is connected in parallel with the series connection of the diode and the first transistor;
      the capacitor is connected to the first resistor at a first internal node; and
      the first internal node is connected to a gate of the first transistor.

4. The article of claim 3, wherein the overshoot-protection circuitry further comprises:
   a second resistor connected between the first internal node and the gate of the first transistor; and
   a second transistor connected between the gate of the first transistor and the switch-gate node, wherein a gate of the second transistor is connected to the switch-gate node.

5. The article of claim 1, wherein the overshoot-protection circuitry is not integrated with the LED controller on a single chip.

6. The article of claim 1, wherein the overshoot-protection circuitry is integrated with the LED controller on a single chip.

7. The article of claim 1, wherein the article further comprises the at least one LED.

8. The article of claim 7, wherein the LED controller is a matrix lighting controller configured to control a plurality of LEDs.

9. The article of claim 8, wherein the article further comprises the plurality of LEDs.

10. The article of claim 1, wherein:
   the LED controller comprises open-circuit (OC) detection circuitry configured to monitor the magnitude of the drain-to-source voltage of the switch in order to detect an OC condition in the LED; and
   by limiting the magnitude of the drain-to-source voltage of the switch, the overshoot-protection circuitry prevents false-positive detection of an OC condition in the LED by the OC detection circuitry.

* * * * *